United States Patent
Fan et al.

(10) Patent No.: US 8,502,943 B2
(45) Date of Patent: Aug. 6, 2013

(54) LIQUID CRYSTAL DISPLAY DEVICE

(75) Inventors: Shih-Hung Fan, Hsinchu (TW); Yuhren Shen, Hsinchu (TW); Cheng-Chung Peng, Hsinchu (TW)

(73) Assignee: Innolux Corporation, Jhu-Nan, Miao-Li County (TW)

( * ) Notice: Subject to any disclaimer, the term of this patent is extended or adjusted under 35 U.S.C. 154(b) by 117 days.

(21) Appl. No.: 13/095,323

(22) Filed: Apr. 27, 2011

(65) Prior Publication Data
US 2011/0199550 A1 Aug. 18, 2011

(30) Foreign Application Priority Data
Jan. 26, 2011 (TW) .............................. 10102880 A

(51) Int. Cl.
*G02F 1/1337* (2006.01)

(52) U.S. Cl.
USPC .......................................... 349/129; 349/130

(58) Field of Classification Search
USPC ................................................. 349/129–130
See application file for complete search history.

(56) References Cited

U.S. PATENT DOCUMENTS

| | | | | |
|---|---|---|---|---|
| 6,952,252 B2 * | 10/2005 | Nakanishi | ..................... | 349/182 |
| 8,059,243 B2 * | 11/2011 | Kim et al. | ..................... | 349/129 |
| 8,269,935 B2 * | 9/2012 | Kuo et al. | ..................... | 349/129 |
| 2003/0086044 A1 | 5/2003 | Inoue et al. | | |
| 2006/0146243 A1 | 7/2006 | Nakanishi et al. | | |
| 2010/0053528 A1 | 3/2010 | Li et al. | | |
| 2010/0157232 A1 | 6/2010 | Kim et al. | | |
| 2010/0253897 A1 | 10/2010 | Ohgami et al. | | |

FOREIGN PATENT DOCUMENTS

| | | |
|---|---|---|
| EP | 2 246 733 A1 | 11/2010 |
| JP | 2003-177418 | 6/2003 |
| JP | 2003-186017 | 7/2003 |
| JP | 2003-255305 | 9/2003 |
| JP | 2003-270653 | 9/2003 |
| TW | 201037423 A1 | 10/2010 |

* cited by examiner

*Primary Examiner* — James Dudek
(74) *Attorney, Agent, or Firm* — Muncy, Geissler, Olds & Lowe, PLLC

(57) ABSTRACT

A new type of liquid crystal display (LCD) device with improved high transmittance and wide-view-angle characteristics while without gray-level inversion at an inclined viewing angle is provided. The LCD device includes a first substrate with common electrodes, a second substrate with at least one pixel unit, a liquid crystal (LC) layer disposed between the first substrate and the second substrate, a first polarizer, and a second polarizer. The pixel unit has a pixel electrode, which is formed by at least one dense electrode area and at least one sparse electrode area. The LC molecules of the LC layer form a continuous-domain alignment after being driven by a voltage.

9 Claims, 15 Drawing Sheets

LIQUID CRYSTAL DISPLAY DEVICE

BACKGROUND OF THE INVENTION

1. Field of Invention

The present invention relates to a liquid crystal display (LCD) device, and more particularly to an LCD device with improved high transmittance and wide-view-angle characteristics while without gray-level inversion at an inclined viewing angle.

2. Related Art

An LCD device controls the light transmittance by using the characteristic that liquid crystal (LC) molecules present different light polarization or refraction effects under different alignments, so as to produce images.

A twisted nematic (TN) LCD device has a good light transmittance characteristic but has an extreme narrow viewing angle as influenced by the structure and optical characteristic of the LC molecules. Therefore, it is a new type of breakthrough for the panel display technique that a display may possess the characteristics of wide-view-angle and high light use rate at the same time.

To solve the transmittance and viewing angle problems, a twisted vertical alignment model has been proposed by the inventor of the present invention, which endows the LCD device with advantages such as the high transmittance and the wide viewing angle. However, the LC molecules are aligned in a vertical alignment manner, so when the LC molecules are applied with a low voltage and the LCD device is watched at an inclined viewing angle, a gray-level inversion problem occurs, which causes the problem of color shift at an inclined viewing angle and influences a normal presentation of images of the LCD device.

This mode as an example may be obtained with reference to FIGS. 1A to 1E. FIG. 1A is a schematic view of azimuth angle and polar angle. FIG. 1B illustrates an electrode structure of a twisted vertical alignment mode. FIG. 1C illustrates V-T curves of LC at different inclined viewing angles (i.e. polar angles) when optical axis of an upper polarizer and a lower polarizer of a LC cell respectively set to be 0° and 90°. From FIGS. 1C to 1E, it is known that a gray-level inversion occurs at an inclined viewing angle of 55° in the situation of a low gray level voltage and an azimuth angle of 0° and 90°.

To eliminate the distortion of V-T curves of the inclined viewing angle, in the prior art, two or more alignment domains are formed in the same pixel, and the V-T curves of the inclined viewing angle in every domain are made to be complementary so as to eliminate the gray-level inversion characteristic. In practice, three specific methods are provided, which are explained as follows. In the first method, one pixel is divided into multiple display areas, and every display area forms a different voltage by means of capacitive coupling, thereby producing the alignment effect of multiple display areas. In the second method, one pixel is divided into multiple display areas and two thin film transistors are used to make each display area form a different voltage, thereby solving the gray-level inversion problem. In the third method, the pixel is divided into two or more display areas and an electronic barrier material is covered above a part of electrode of the display area, thereby producing the alignment effect of multiple display areas.

However, the methods for solving the gray-level inversion problem in the prior arts have complicated LCD device processes. In view of the above, it is the subject of the present invention to provide a simple method with improved high transmittance and the wide-view-angle characteristics while eliminating the gray-level inversion at an inclined viewing angle by producing different electrical fields in each display area, so that the LCD device can present optimal images.

SUMMARY OF THE INVENTION

The present invention is directed to an LCD device with high transmittance and wide-view-angle characteristics while using a pixel electrode with at least one dense electrode area and at least one sparse electrode area to solve gray-level inversion at an inclined viewing angle.

To achieve the above objectives, the present invention provides an LCD device at least having a display area, which includes a first substrate, a second substrate, an LC layer, a first polarizer, and a second polarizer. The first substrate has a common electrode. The second substrate has at least one pixel unit. The pixel unit has a pixel electrode and the pixel electrode consists of at least one dense electrode area and at least one sparse electrode area. The LC layer is disposed between the first substrate and the second substrate and LC molecules form a continuous-domain alignment after being driven by a voltage. The first polarizer is disposed above the first substrate. The second polarizer is disposed below the second substrate and has a polarization axis perpendicular to a polarization axis of the first polarizer.

In an embodiment, the pixel electrode preferably includes a plurality of trunks. Each trunk forms a plurality of branch electrode areas after being branched each time. The plurality of branch electrode areas has different electrode widths and/or electrode gap widths to form the dense electrode area and the sparse electrode area.

In an embodiment, the LC layer is preferably doped with chiral dopants and selects optimal Δnd and d/p parameters, so that as α is at any angle, a transmittance T is always greater than a minimal transmittance $T_{min}$, and the $T_{min}$ may be 0.9 or less of a maximal transmittance, where Δn is a birefringence of an LC material, d is a thickness of the LC layer, p is a pitch of the chiral dopants, α is defined to be an angle included between an alignment direction of LC molecules in the LC layer and a polarization axis of one polarizer. Under the maximal operating voltage, the d/p parameter is preferably set between 0.222-0.36 and Δnd parameter is preferably set between 0.465-0.620.

To make the present invention comprehensive, the specific contents and effects of the present invention are illustrated in details below with reference to the exemplary embodiments in accompanying with drawings and numbers.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1A:
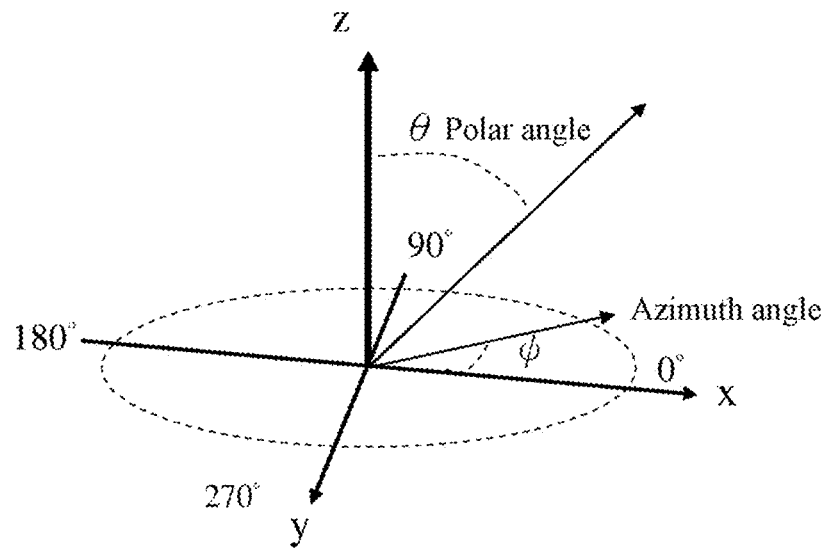
FIG. 1A is a schematic view of a polar angle and an azimuth angle.
Figure 1B:
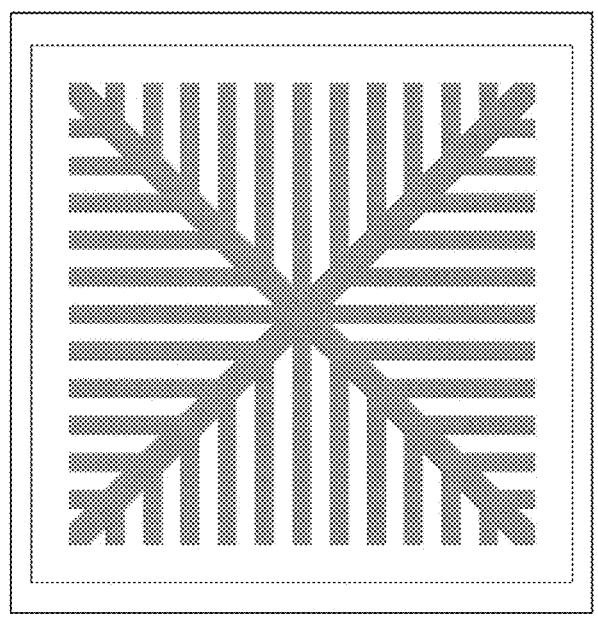
FIG. 1B is a schematic view of a twisted vertical alignment electrode structure.
Figure 1C:
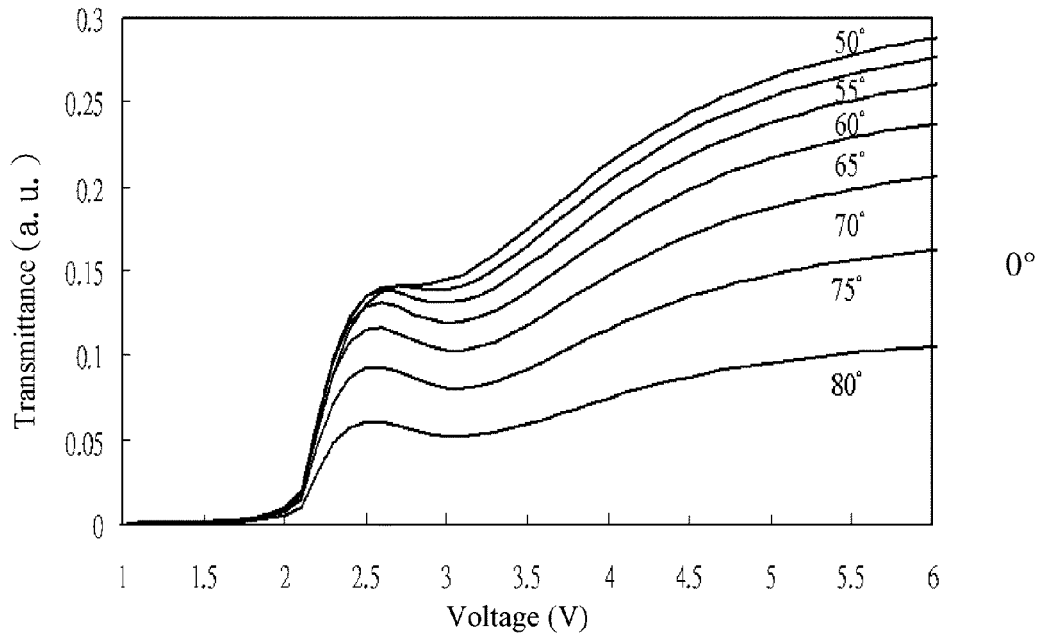
FIG. 1C shows V-T curves at an inclined viewing angle when the electrode structure in FIG. 1B is at 0° azimuth angle.
Figure 1D:
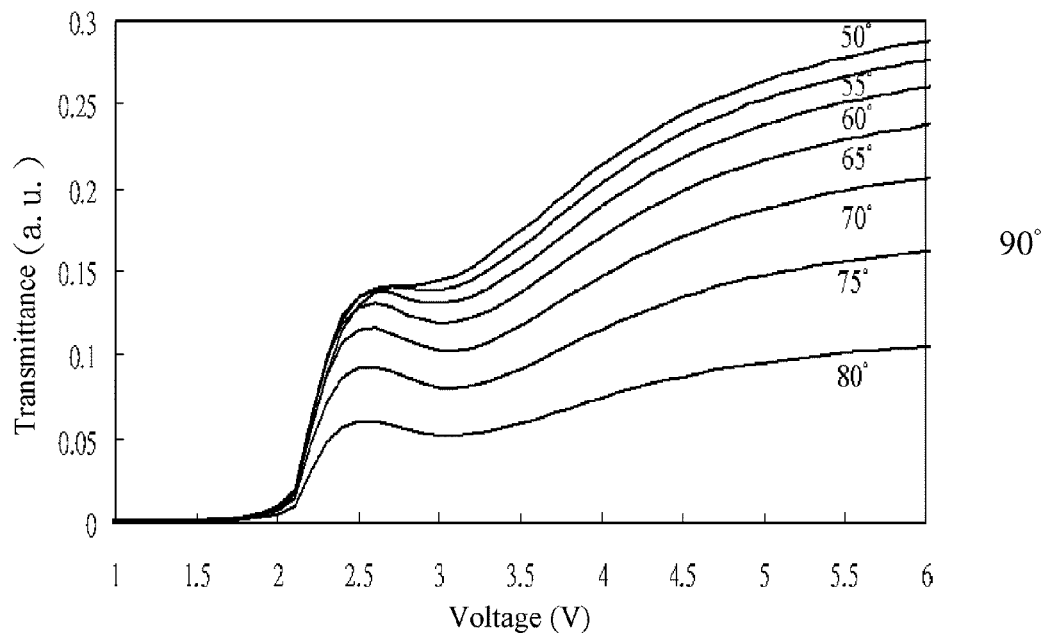
FIG. 1D shows V-T curves at an inclined viewing angle when the electrode structure in FIG. 1B is at 90° azimuth angle.
Figure 1E:
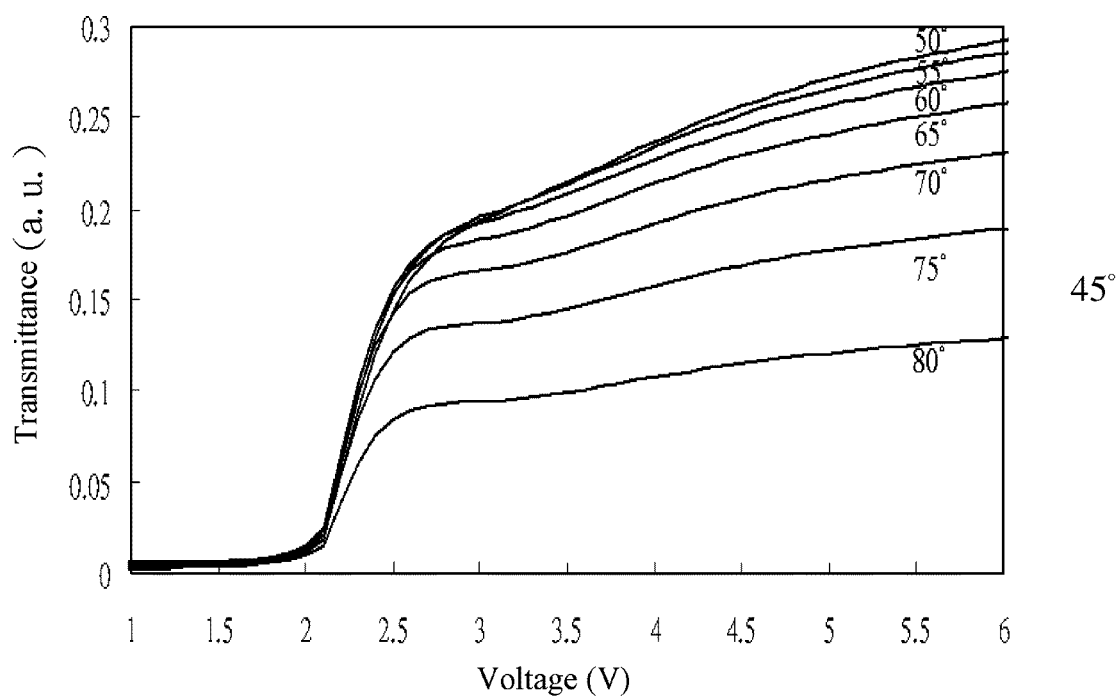
FIG. 1E shows V-T curves at an inclined viewing angle when the electrode structure in FIG. 1B is at 45° azimuth angle.

To eliminate the problems existing in the prior arts, the present invention provides a new type of electrode architecture which is designed for a single display area, in which one or more display areas form a single pixel to obtain an expected function.

The present invention discloses an LCD device at least having a display area, which includes a first substrate, a second substrate, an LC layer, a first polarizer, and a second polarizer. The first substrate has a common electrode. The second substrate has at least one pixel unit. The pixel unit has a pixel electrode. The pixel electrode consists of at least one dense electrode area and at least one sparse electrode area. The LC layer is disposed between the first substrate and the second substrate. After being driven by a voltage, the LC molecules of the LC layer form a continuous-domain alignment. The first polarizer is disposed above the first substrate. The second polarizer is disposed below the second substrate and has a polarization axis perpendicular to a polarization axis of the first polarizer.

The pixel electrode includes a plurality of trunks. Each trunk forms a plurality of branch electrode area after being branched each time. The plurality of branch electrode areas has different electrode widths and/or electrode gap widths, so as to form the dense electrode area and the sparse electrode area. In each branch electrode area, the electrode may be branched at any angle. In an embodiment, the branch electrode areas of the dense electrode area and the sparse electrode area may also be respectively branched at different angles.

Furthermore, in each branch electrode area, the electrode widths or the electrode gap widths may also have equal intervals or non-equal intervals. The electrode width is between 1 μm and 5 μm.

The alignment method of the dense electrode area and the sparse electrode area may be as follows. The dense electrode area surrounds an outer periphery of the sparse electrode area. Alternatively, the sparse electrode area surrounds an outer periphery of the dense electrode area. Alternatively, the sparse electrode area and the dense electrode area are both arranged between the trunks.

Bumps, recesses or an electrode pattern structure that forms a fringe field may also be disposed at a center and/or on periphery of the pixel unit between the first substrate and the second substrate, so as to improve the stability of molecular alignment.

The LC layer may adopt a vertically aligned negative dielectric anisotropy LC material doped with chiral dopants or a vertically aligned n-type LC material. During implementation, the LC layer is preferably doped with chiral dopants and selects optimal $\Delta nd$ and $d/p$ parameters, so that as $\alpha$ is at any angle, the transmittance T is always greater than a minimal transmittance $T_{min}$ and the $T_{min}$ may be 0.9 or less of a maximal transmittance, where $\Delta n$ is a birefringence of the LC material, d is a thickness of the LC layer, p is a pitch of the chiral dopants, $\alpha$ is defined to be an angle included between an alignment direction of LC molecules in the middle LC layer and a polarization axis of one polarizer. $T_{min}$ is, for example, 0.9 of the maximal transmittance, and under the maximal operating voltage, the d/p parameter is preferably set between 0.222-0.36 and $\Delta nd$ parameter is preferably set between 0.465-0.620.

To further explain the embodiments of the present invention, four different implementations are illustrated as follows.

Embodiment 1

Figure 2A:
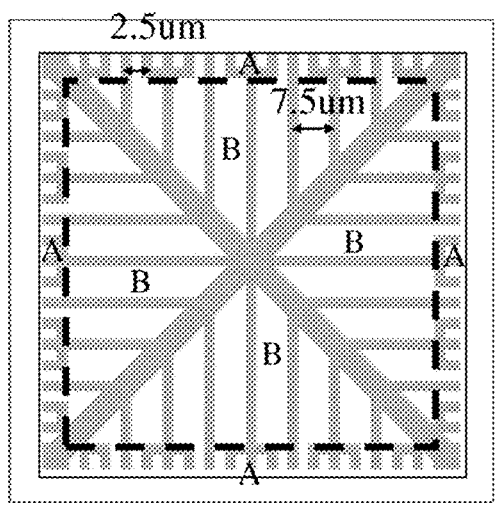
FIG. 2A is a schematic view of a pixel electrode structure in the first embodiment.

In FIG. 2A, a square LCD unit as shown in the figure is taken as an example in this embodiment. In a display apparatus, one or more LCD units form one pixel unit, and the LCD unit is not limited to be square. In this embodiment, the LC layer adopts a twisted vertical alignment mode. In the condition that $T_{min}$ is 0.9 of the maximal transmittance and under the maximal operating voltage, preferably, the range of parameter d/p is 0.222-0.360, the range of parameter $\Delta nd$ is 0.465-0.620, and the electrode width is between 1-5 μm. For simplicity, in this embodiment, the simulation is carried out under the conditions that d/p=0.277 and $\Delta nd$=0.530, and the optical axis of the upper and lower polarizers of the liquid crystal cell are respectively set to be at 0° and 90°.

In FIG. 2A, the electrode width of the pixel electrode pattern is 2.5 μm, in which four trunks extend to form branch electrode areas B with a gap width of 7.5 μm. Each branch electrode area B may extend to form a new type of branch electrode areas A with a gap width of 2.5 μm. The branch electrode areas A are the dense electrode areas outside and the branch electrode areas B are the sparse electrode areas inside.

Figure 2B:
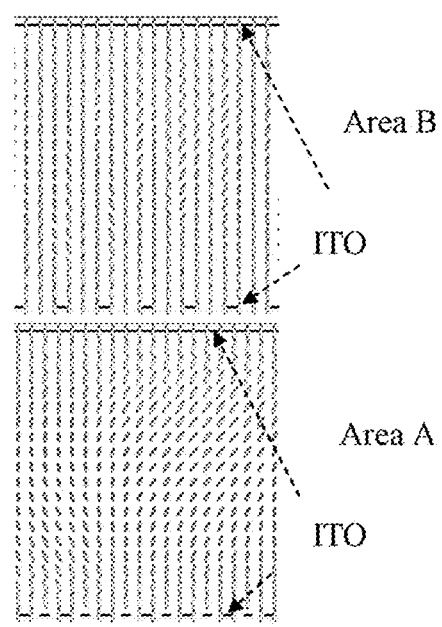
FIG. 2B is a side view of low gray level voltage molecules in areas A and B in FIG. 2A.

After a voltage is applied, due to the function of the surrounding fringe field, the LC molecules are inclined towards the center of the display area and present a continuous symmetrical alignment. The electrodes are dense and the electrical field is large in the area A, so the LC molecules are inclined at a large angle. The electrodes are sparse in the area B and the electrical field in the area B is smaller than that of the area A, so the LC molecules are inclined at a small angle (as shown in FIG. 2B). In other words, the LC molecules in the above two areas have different inclined angles in accordance with the changes of the voltage, and optically form a different V-T curves.

Figure 2C:
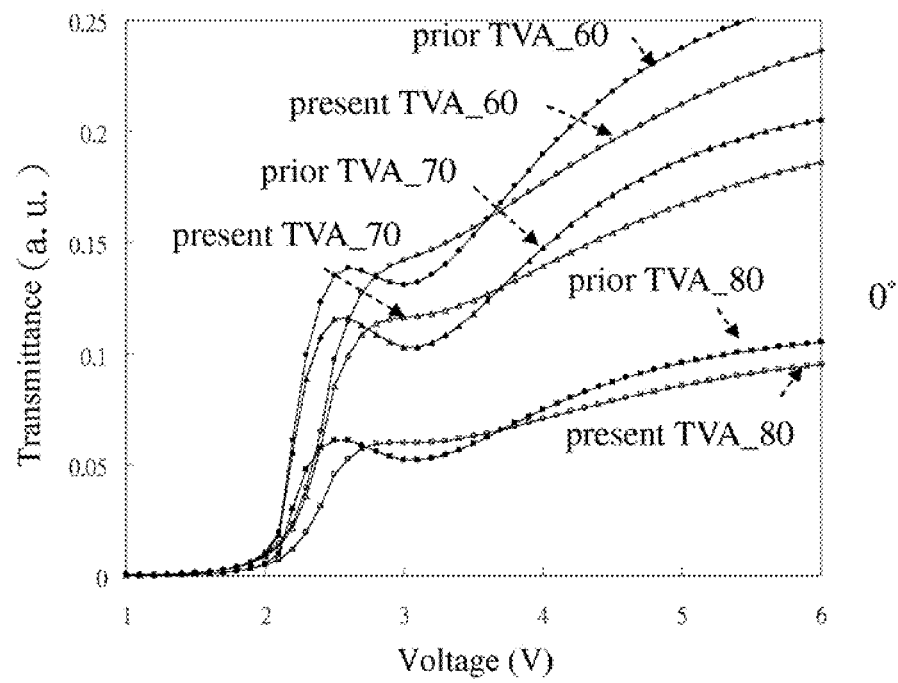
FIG. 2C shows V-T curves at an inclined viewing angle when the electrode structure in FIG. 2A is at 0° azimuth angle.
Figure 2D:
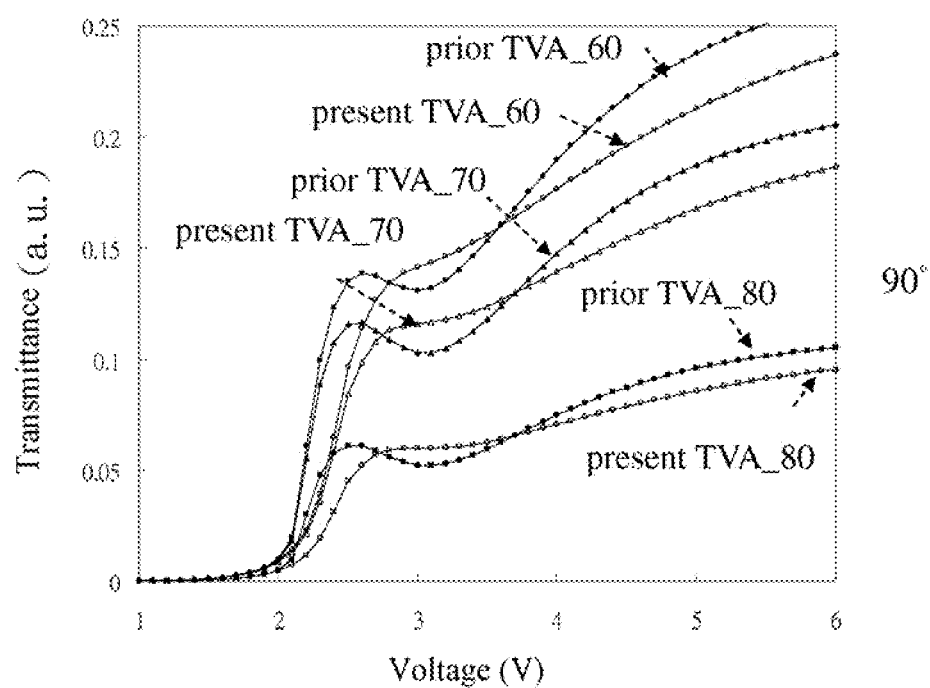
FIG. 2D shows V-T curves at an inclined viewing angle when the electrode structure in FIG. 2A is at 90° azimuth angle.

During the implementation, the transmittance at the inclined viewing angle of the areas A, B can be easily modulated by modulating the electrode density and the area of the areas A and B, thus achieving the complementary effect. As shown in FIGS. 2C and 2D, under the condition that the area of the dense electrode is set to account for 2/5 of the total area, the transmittance curve graph at the inclined viewing angle is simulated. It can be easily found from the graph that the inversion at the inclined viewing angle can be completely eliminated by the complementary of the areas A and B, thereby further improving the characteristic of the viewing angle.

Embodiment 2

Figure 3A:
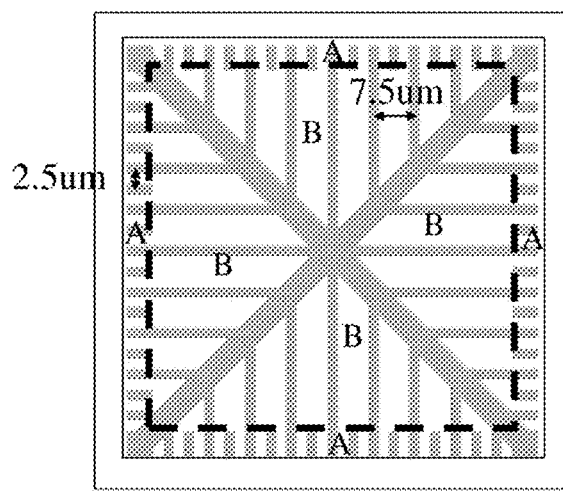
FIG. 3A is a schematic view of a pixel electrode structure in the second embodiment.

In this embodiment, a 100 μm×100 μm square LCD unit is taken as an example for illustration. FIG. 3A illustrates a pixel electrode, in which the pixel electrode structure is divided into a dense electrode area A and a sparse electrode area B. The dense electrode area A is a periodic structure consisting of 2.5 μm electrode and 2.5 μm electrode gap, and the sparse electrode area B is a periodic structure consisting of 2.5 μm electrode and 7.5 μm electrode gap. The area A surrounds an outer periphery of the area B and is connected to the area B by a wire under the substrate.

Figure 3B:
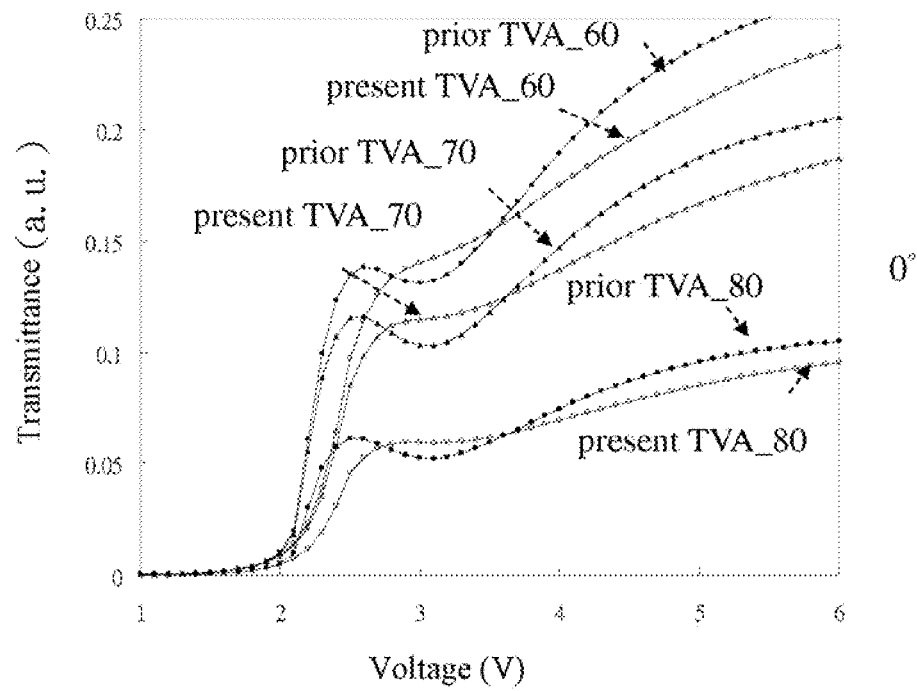
FIG. 3B shows V-T curves at an inclined viewing angle when the electrode structure in FIG. 3A is at 0° azimuth angle.
Figure 3C:
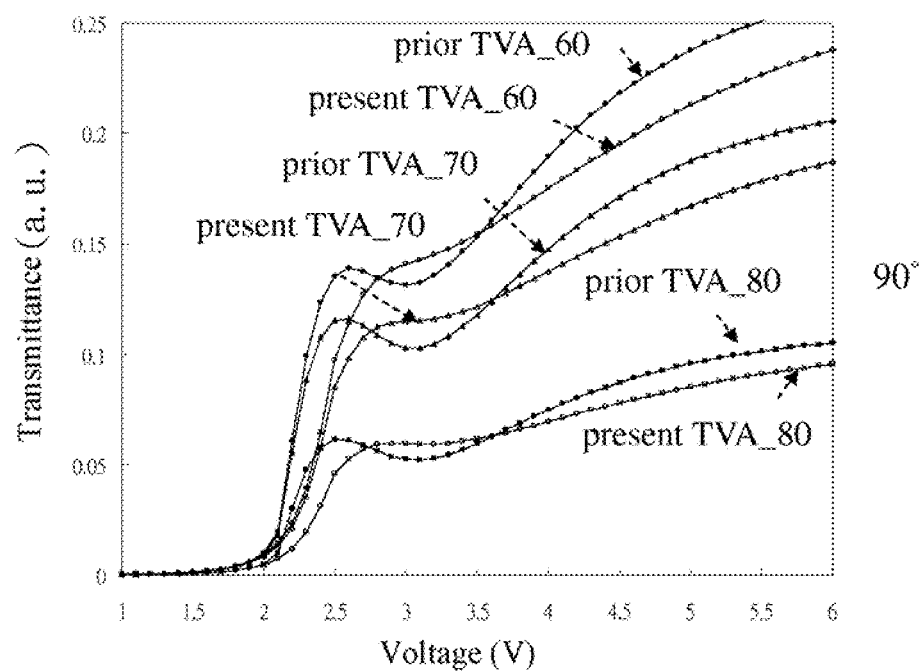
FIG. 3C shows V-T curves at an inclined viewing angle when the electrode structure in FIG. 3A is at 90° azimuth angle.

After a voltage is applied, the electrical field of the area A is large, so the LC molecules are inclined at a large angle. The electrical field of the area B is small, so the LC molecules are inclined at a small angle accordingly. At last, after the electrode areas of the areas A and B are modulated, under the above design conditions, when the area of the area A is smaller than 0.5 of the total area, the V-T curve inversion at the inclined viewing angle can be eliminated. As shown in FIGS. 3B and 3C, under the condition that the area of the area A is 2/5 of the total area, the area A and the area B are complementary, thus effectively eliminating the inversion problem.

Embodiment 3

Figure 4A:
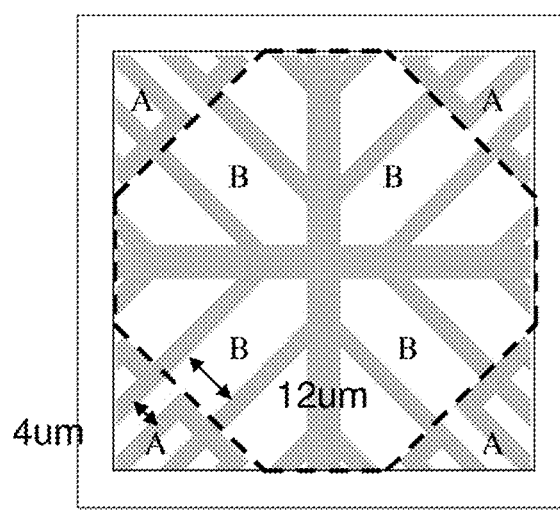
FIG. 4A is a schematic view of a pixel electrode structure in the third embodiment.

In this embodiment, a 100 μm×100 μm square LCD unit is taken as an example for illustration. FIG. 4A illustrates a pixel electrode, in which the pixel electrode structure has a dense electrode area A and a sparse electrode area B formed by a trunk branched at 45°. The dense electrode area A is a periodic structure consisting of 4 μm electrode and 4 μm electrode gap, and the sparse electrode area B is a periodic structure consisting of 4 μm electrode and 12 μm electrode gap. The area A surrounds an outer periphery of the area B.

After a voltage is applied, the electrical field of the area A is large, so the LC molecules are inclined at a large angle. The electrical field of the area B is small, so the LC molecules are inclined at a small angle accordingly.

Figure 4B:
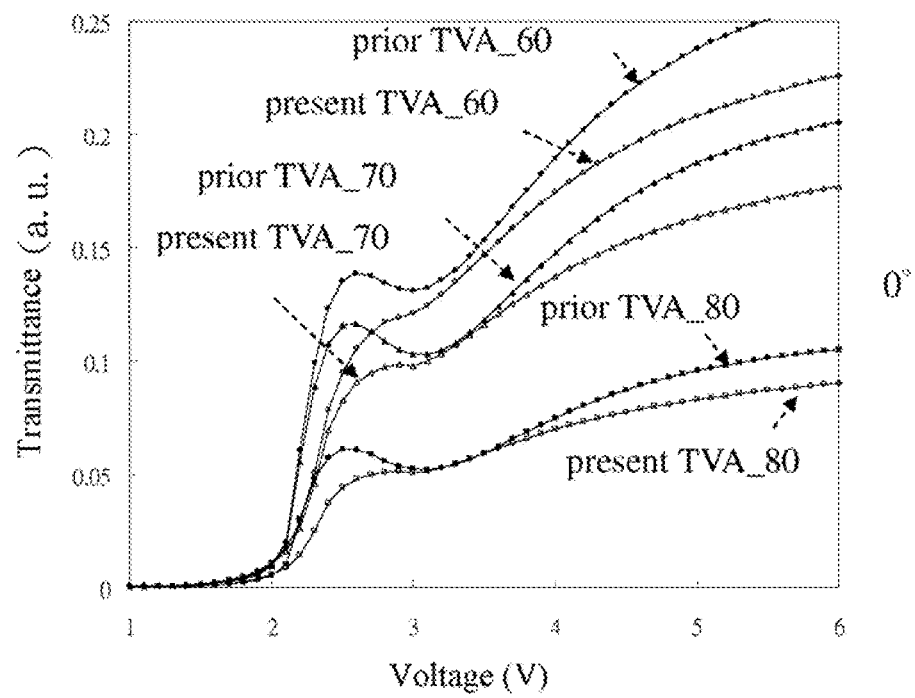
FIG. 4B shows V-T curves at an inclined viewing angle when the electrode structure in FIG. 4A is at 0° azimuth angle.
Figure 4C:
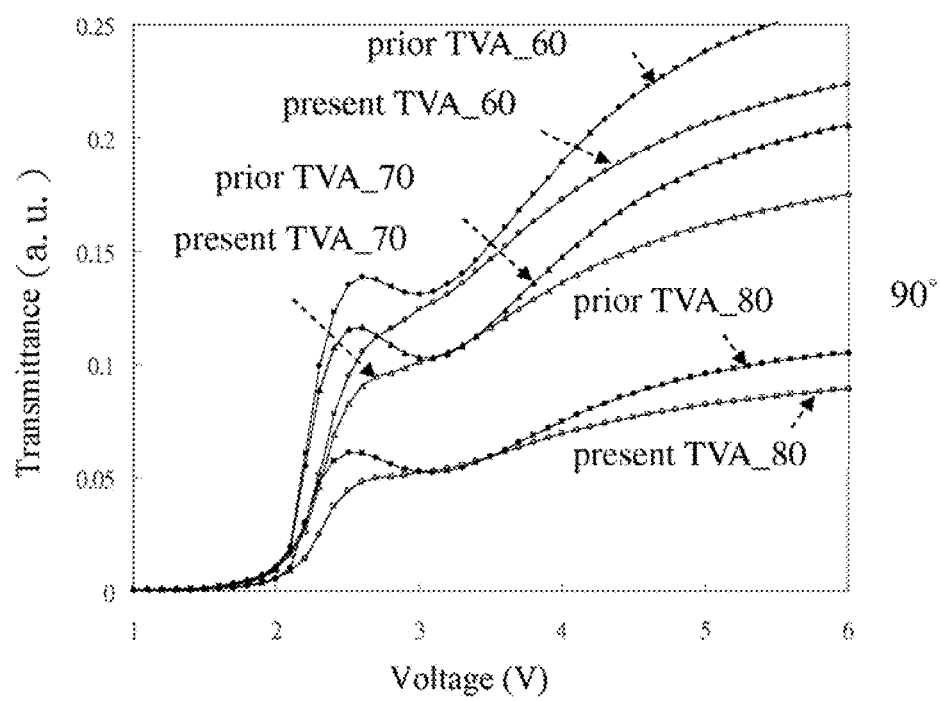
FIG. 4C shows V-T curves at an inclined viewing angle when the electrode structure in FIG. 4A is at 90° azimuth angle.

At last, after the electrode areas of the areas A and B are modulated, under the above design conditions, when the area of the area A is smaller than 0.5 of the total area, the V-T curve inversion at the inclined viewing angle can be eliminated. As shown in FIGS. 4B and 4C, under the condition that the area of the area A is 2/5 of the total area, the area A and the area B are complementary, thus effectively eliminating the inversion problem.

Embodiment 4

Figure 5A:
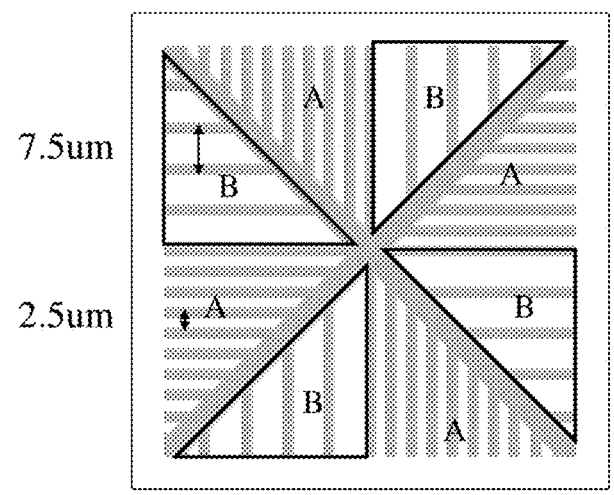
FIG. 5A is a schematic view of a pixel electrode structure in the fourth embodiment.

In this embodiment, a 100 μm×100 μm square LCD unit is taken as an example for illustration. FIG. 5A illustrates a pixel electrode, in which the pixel electrode structure has a dense electrode area A and a sparse electrode area B on the left and the right branched by a trunk, and the dense and sparse electrode areas may be exchanged. The dense electrode area A is a periodic structure consisting of 2.5 μm electrode and 2.5 μm electrode gap and the sparse electrode area B is a periodic structure consisting of 2.5 μm electrode and 7.5 μm electrode gap.

After a voltage is applied, the electrical field of the area A is large, so the LC molecules are inclined at a large angle. The electrical field of the area B is small, so the LC molecules are inclined at a small angle accordingly.

Figure 5B:
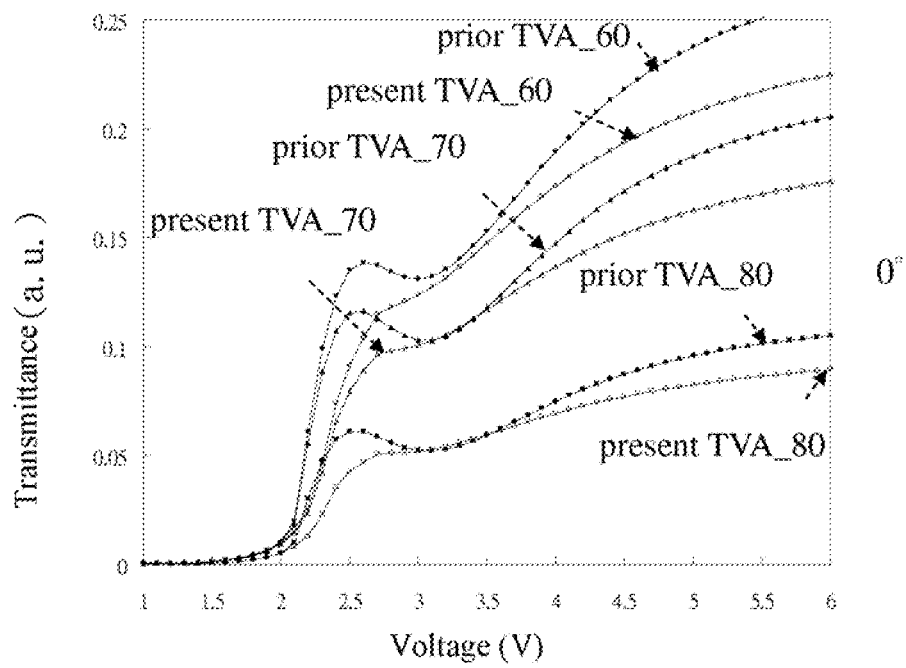
FIG. 5B shows V-T curves at an inclined viewing angle when the electrode structure in FIG. 5A is at 0° azimuth angle.
Figure 5C:
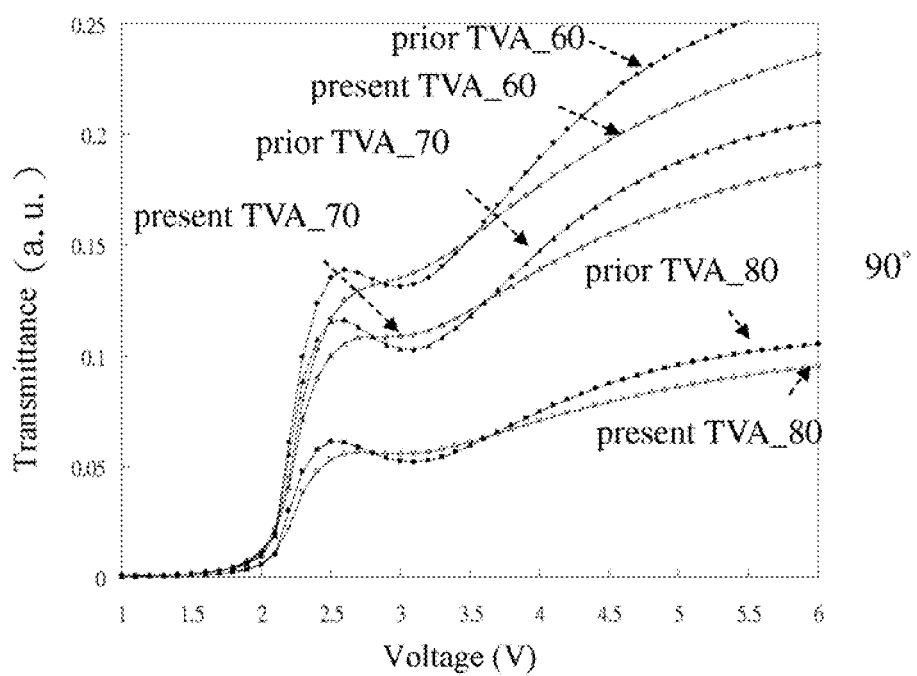
FIG. 5C shows V-T curves at an inclined viewing angle when the electrode structure in FIG. 5A is at 90° azimuth angle.

At last, after the electrode areas of the areas A, B are modulated, under the above design conditions, when the area of the area A is smaller than 0.5 of the total area, the V-T curve inversion at the inclined viewing angle can be eliminated. As shown in FIGS. 5B and 5C, under the condition that the area of the area A is 1/2 of the total area, the area A and the area B are complementary, thus effectively eliminating the inversion problem.

Figure 6A:
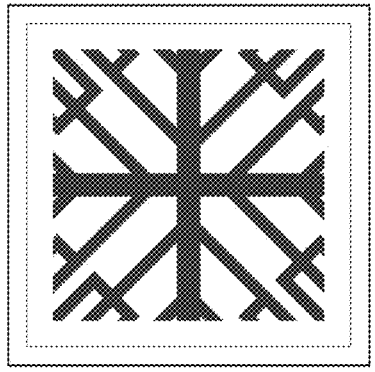
FIGS. 6A to 6U show different types of pixel electrode pattern structure.
Figure 6B:
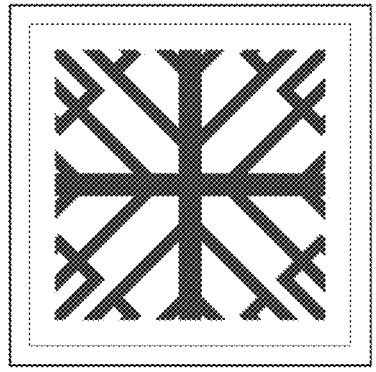
Figure 6C:
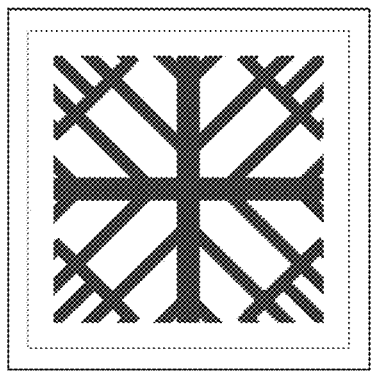
Figure 6D:
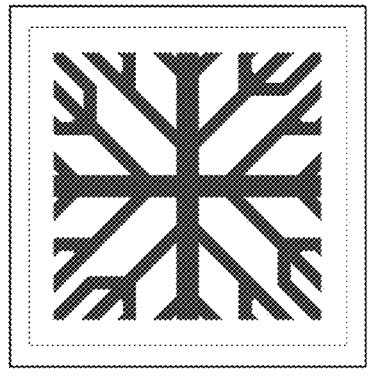
Figure 6E:
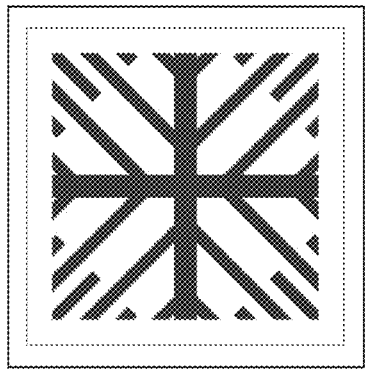

In addition to the above embodiments, the pattern of the pixel electrode may also be designed to be other suitable structures. FIGS. 6A to 6U show different pixel electrode pattern structures. FIGS. 6A to 6K show a pixel electrode pattern structure aligned at 45° and 135°. FIGS. 6L to 6U show a pixel electrode pattern structure aligned at 0° and 90°. Furthermore, as shown in FIGS. 6A-6I and FIGS. 6L-6R, each branch electrode may also be connected with more than two new branches. As shown in FIGS. 6D, 6G, 6L and 6P, the branch connection electrode may also be designed to have a certain angle.

Figure 6F:
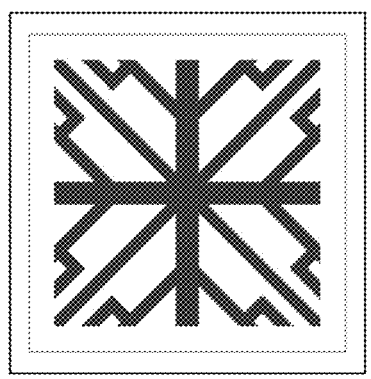
Figure 6G:
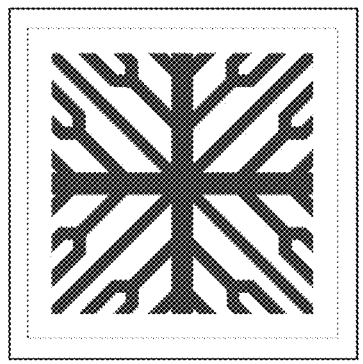
Figure 6H:
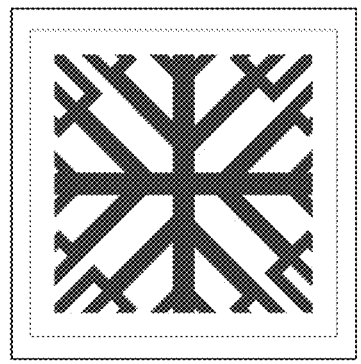
Figure 6I:
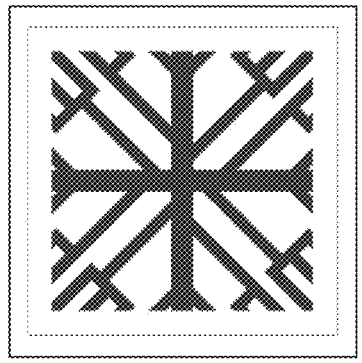
Figure 6J:
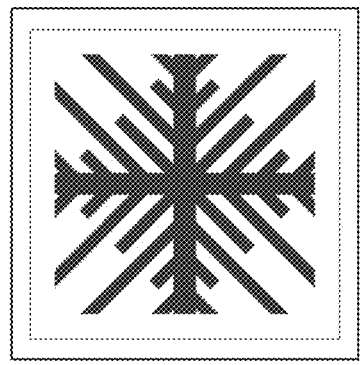
Figure 6K:
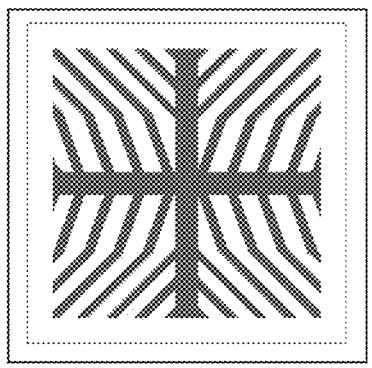
Figure 6L:
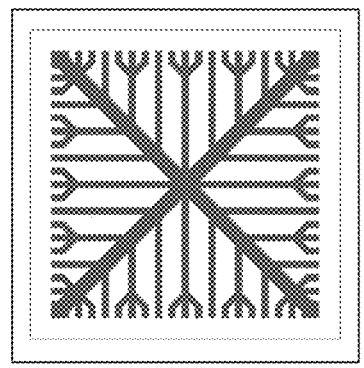
Figure 6M:
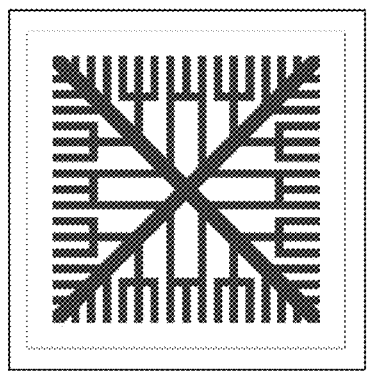
Figure 6N:
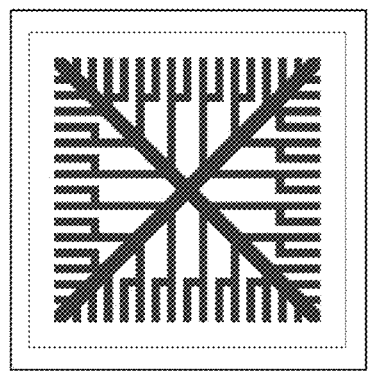
Figure 6O:
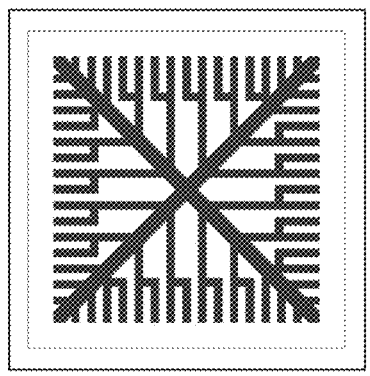
Figure 6P:
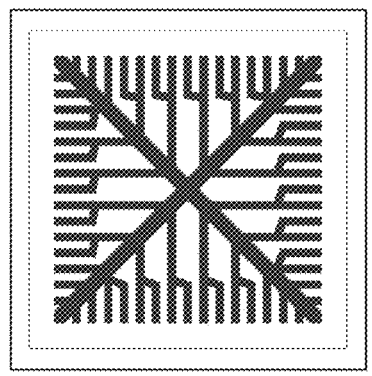
Figure 6Q:
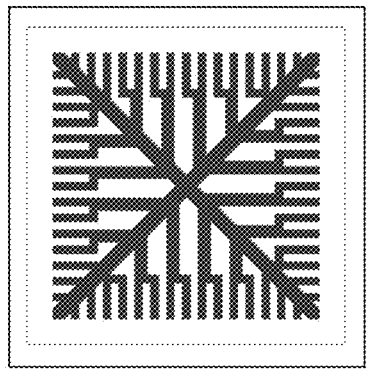
Figure 6R:
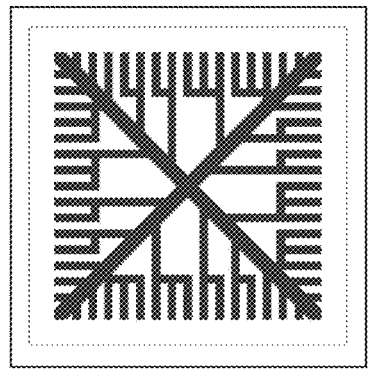
Figure 6S:
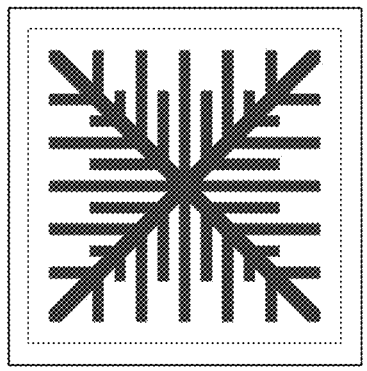
Figure 6T:
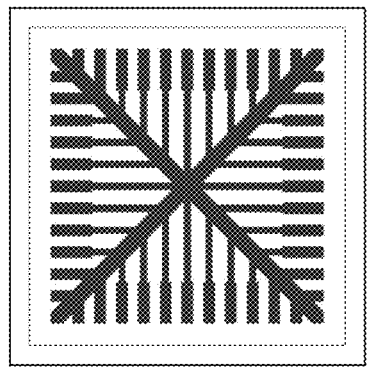
Figure 6U:
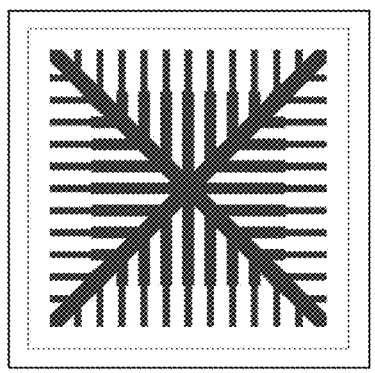

As shown in FIGS. 6A and 6F, the two have the same dense electrode period and different sparse electrode periods. In FIGS. 6J and 6S, the sparse electrode is disposed at an outer periphery of the dense electrode. In FIG. 6K, the sparse and the dense electrode areas have different electrode angles. In FIGS. 6H and 6Q, the widths of the sparse electrode and the dense electrode are different. In FIGS. 6I and 6R, in the same electrode area (e.g. the sparse electrode area herein), different periods may exist. In FIGS. 6T and 6U, the inner and outer electrodes are endowed with different electrode widths, thus obtaining the sparse and the dense electrode areas.

According to the electrode pattern structures in the above embodiments and FIGS. 6A to 6U, all the electrode and gap widths of the sparse electrode area and the dense electrode area or the design of the electrode shape and the area proportion are always adjusted in accordance with different practical applications, thereby eliminating the V-T curve inversion at the inclined viewing angle.

In summary, the present invention can truly achieve the expected objectives and provide an LCD device with high transmittance and wide-view-angle characteristics while without gray-level inversion at an inclined viewing angle. Therefore, the present invention certainly has the industrial applicability and is proposed and applied for a patent according to law.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display (LCD) device, at least having a display area, comprising:
   a first substrate with a common electrode;

a second substrate with at least one pixel unit, wherein the pixel unit has a pixel electrode, wherein the pixel electrode comprises a plurality of trunk electrodes, a plurality of branch electrodes and a plurality of sub-branch electrodes, parts of the branch electrodes are connected to one of the trunk electrodes, and parts of the sub-branch electrodes are connected to one of the branch electrodes;

a liquid crystal (LC) layer, disposed between the first substrate and the second substrate, wherein after being driven by a voltage, the LC molecules of the LC layer form a continuous-domain alignment;

a first polarizer, disposed above the first substrate; and a second polarizer, disposed below the second substrate and having a polarization axis perpendicular to a polarization axis of the first polarizer, wherein the LC layer is doped with chiral dopants and selects optimal $\Delta$nd and d/p parameters, so that as $\alpha$ is at any angle, the transmittance T is always greater than a minimal transmittance $T_{min}$, where $\Delta n$ is a birefringence of the LC material, d is a thickness of the LC layer, p is a pitch of the chiral dopants, $\alpha$ is defined to be an angle included between an alignment direction of LC molecules in the middle LC layer and a polarization axis of one polarizer.

2. The LCD device according to claim 1, wherein the LC layer adopts a vertically aligned n-type LC material doped with chiral dopants or a vertically aligned negative dielectric anisotropy LC material.

3. The LCD device according to claim 1, wherein the electrode gap widths between the branch electrodes are different from the electrode gap widths of the sub-branch electrodes.

4. The LCD device according to claim 3, wherein the electrode widths or the electrode gap widths of the branch electrodes have equal intervals.

5. The LCD device according to claim 3, wherein the electrode width of each branch electrodes is between 1 µm and 5 µm.

6. The LCD device according to claim 3, wherein the branch electrodes are branched from the trunk electrodes at any angle, and the sub-branch electrodes are branched form the branch electrodes at any angle.

7. The LCD device according to claim 6, wherein the angles between the trunk electrodes and the branch electrodes are different from the angles between the branch electrodes and the sub-branch electrodes.

8. The LCD device according to claim 1, wherein the sub-branch electrodes surround an outer periphery of the trunk electrodes.

9. The LCD device according to claim 1, wherein the sub-branch electrodes surround an outer periphery of the branch electrodes.

* * * * *